Sept. 22, 1970    E. G. OBEDA    3,529,660
SOLID HORN WITH COOLING MEANS
Filed Nov. 20, 1968

INVENTOR.
EDWARD G. OBEDA
BY
Erwin B. Steinberg

United States Patent Office 3,529,660
Patented Sept. 22, 1970

3,529,660
SOLID HORN WITH COOLING MEANS
Edward G. Obeda, Brookfield, Conn., assignor to Branson Instruments, Incorporated, Stamford, Conn., a corporation of Delaware
Filed Nov. 20, 1968, Ser. No. 777,223
Int. Cl. F24h 3/00
U.S. Cl. 165—47                    4 Claims

ABSTRACT OF THE DISCLOSURE

A solid horn as used for sonic or ultrasonic processing, such as welding, is provided with gas cooling means which include a central longitudinal bore, a plurality of radial gas escape holes, and a shroud for directing the gas flow along the horn.

---

This invention refers to the construction of solid horns, sometimes referred to as concentrators, rods, tools, and amplitude or velocity transformers, as are used on either piezoelectric or magnetostrictive transducers to amplify the displacement or particle velocity of the transducer. They also provide a more suitable impedance match between the transducer and the load to which the transducer is to be coupled.

Conventional sonic or ultrasonic welding apparatus as shown for instance in U.S. Pat. No. 3,284,257, issued to R. S. Soloff et al., "Method of Bonding Non-Thermoplastic Parts by Sonic Energy," dated Nov. 8, 1966, comprise a high frequency electric generator providing power to an ultrasonic energy converter which includes a piezoelectric or magnetostrictive transducing means for converting the electric energy applied to mechanical vibration. The converter is fitted with a solid horn for engaging the workpiece and is dimensioned to resonate as a half wave resonator along its longitudinal axis for transferring the vibrations produced by the converter to the workpiece. The horn itself, usually a longitudinal bar of aluminum or titanium metal, may take various shapes to form a stepped horn, a conical horn, an exponential horn, a catenoidal horn, etc., see for instance, "Ultrasonic Engineering" (book) by Julian R. Frederick, John Wiley & Sons, Inc., New York, New York (1965), pages 87 through 103. Responsive to the dissipation of sonic energy thermoplastic surfaces are welded. Other apparatus of this kind are used for metal deformation, abrasive slurry machining, metal welding, providing emulsions, etc., see J. R. Frederick supra.

When transferring large amounts of power, such as when welding massive thermoplastic parts to each other, it has been found that the frontal portion of the horn heats up and that this heating has a disturbing effect. Primarily, the horn being in contact with thermoplastic material, either softens the thermoplastic material at the area of contact or prevents cooling of the thermoplastic material and hardening thereof immediately after the cessation of acoustic power transfer. While in some instances it is possible to immerse the frontal portion of the horn into a coolant immediately after each welding cycle, this is not readily possible when a large number of parts are to be welded on a production line basis. It has been found necessary, therefore, to design a horn which is provided with cooling means, such as a flow of air, in order to cool the horn itself, but also maintain the thermoplastic part with which the horn is in contact at a desirable low temperature.

One of the principal objects of this invention is, therefore, the provision of a new and improved horn for sonic or ultrasonic processing purposes.

Another important object of this invention is the provision of a solid horn provided with cooling means.

A further important object of this invention is the provision of a solid metallic horn adapted to be cooled by fluid flow means, such as gas or air.

Further and still other objetcs of this invention will be more clearly apparent by reference to the following description when taken in conjunction with the accompanying drawings, in which.

Figure 1:
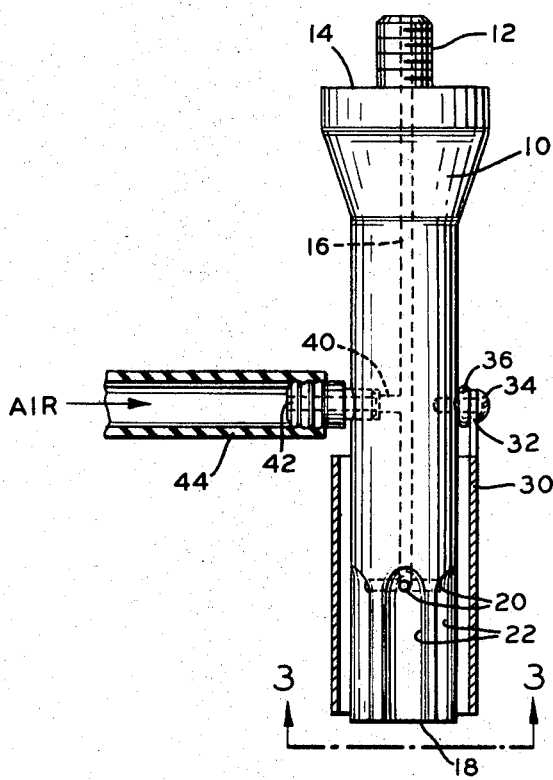
FIG. 1 is an elevational view, partly in section, of a typical horn design according to the present invention.

Referring now to the figures and FIG. 1 in particular, numeral 10 depicts a typical solid horn made, for instance, of titanium metal having a maximum diameter of ¾" diameter and being designed for operation at 20 kHz. The length of the material is calculated as described in the book by J. R. Frederick supra. The horn, by means of a stud 12 and its radial surface 14, is adapted to be coupled to a sonic energy converter in order to receive vibratory energy which causes the horn to oscillate in its longitudinal direction. A converter suitable for this purpose is shown for instance in U.S. Pat. No. 3,328,610, issued to S. E. Jacke et al., dated June 27, 1967, entitled "Sonic Wave Generator."

Figure 2:
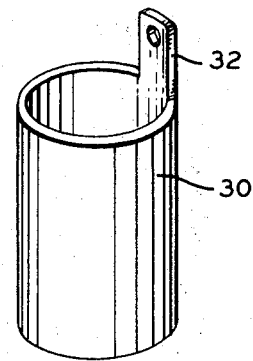
FIG. 2 is a perspective view of the shroud shown sectioned in FIG. 1.
Figure 3:
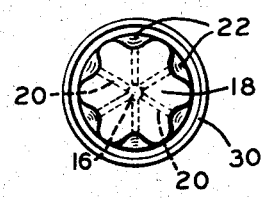
FIG. 3 is a bottom plan view taken along line 3–3 in FIG. 1.

The horn is provided with a longitudinal central bore 16 which terminates a definite distance above the frontal and work engaging surface 18 of the horn. The bore 16 is in communication with a plurality of peripherally spaced radial holes 20. Each radial hole is associated with a longitudinal groove 22, providing a fluted front portion of the horn. The fluted horn portion increases the circumferential area of the horn and thereby provides additional cooling surface. The frontal portion of the horn is enclosed by a cylindrical sheet metal shroud 30 having an extending tab 32, see also FIG. 2. The shroud 30 is fastened to the horn by means of a screw 34, the tab 32 and a vibration isolating resilient gasket 36. The shroud is affixed to the horn preferably in such a way that the screw 34 is located in the nodal region of the horn, there being substantially no vibration in the longitudinal direction. It will be apparent that the frontal surface 18 of the horn slightly extends beyond the lower end of the shroud.

The horn 14, moreover, is provided with a further radial hole 40, also located most suitably in the nodal region and this hole is fitted with a gas or air flow connector 42 which, in turn, is adapted to receive a hose 44. The hole 40 is in communication with the central bore 16.

Suitable cooling gas, such as dry nitrogen or air, is fed from the hose 44 through the radial hole 40 into the longitudinal bore 16. Since the upper end of the bore 16 is threaded normally into a solid connecting piece, the cooling fluid is directed downward and escapes through the plurality of radial holes 20 and then is directed by the shroud 30 along the longitudinal axis of the horn both in a downward direction, toward the workpiece, and also some air, by necessity, flows upward in the cylindrical space defined by the shroud and the horn. As the cooling fluid flows along the length of the lower horn portion it cools the horn and maintains the horn at an acceptable temperature level. The fluted peripheral surface of the horn provides increased surface area and, thus, materially contributes to the improved heat transfer from the horn to the cooling fluid. Additionally, it has been found that the cooling provided also has a beneficial effect upon the workpiece at the location contacted by the horn in that the workpiece is cooled, thus preventing softening of the material at areas removed from the primary dissipation of sonic energy.

What is claimed is:

1. A solid horn adapted to vibrate along its longitudinal axis as a half-wave resonator in response to acoustic energy applied thereto at one end, said horn including:
 a shroud disposed about that portion of the horn which is in proximity to a workpiece adapted to be engaged by said horn, said shroud delimiting a peripheral space about said horn portion;
 a central bore disposed in said horn adapted to be fed with cooling gas;
 a set of circumferentially spaced radial holes in communication with said bore and terminating along the periphery of said horn at a location opposite said shroud;
 whereby said shroud causes gas escaping from said radial holes to flow longitudinally along the periphery of said horn.

2. A solid horn as set forth in claim 1 and including a further radial hole disposed substantially in the nodal zone of said horn and communicating with said central bore; a fluid flow connector coupled to said further radial hole for admitting cooling gas to said further radial hole and said central bore.

3. A solid horn as set forth in claim 1, said horn being made of metal and provided with means for increasing its surface disposed in said space and exposed to coolant flow.

4. A solid horn as set forth in claim 1, said shroud being a cylindrical piece of metal having an extending tab attached to the horn.

References Cited

UNITED STATES PATENTS

| | | | |
|---|---|---|---|
| 2,506,596 | 5/1950 | Howard | 165—47 |
| 3,438,428 | 4/1969 | Balamuth et al. | 228—1 |

ROBERT A. O'LEARY, Primary Examiner

C. SUKALO, Assistant Examiner

U.S. Cl. X.R.

228—1